(12) United States Patent
Edwards et al.

(10) Patent No.: US 9,681,004 B2
(45) Date of Patent: Jun. 13, 2017

(54) DELIVERY OF ELECTRICAL POWER

(71) Applicant: BRITISH TELECOMMUNICATIONS public limited company, London (GB)

(72) Inventors: Nicholas Hector Edwards, London (GB); Ian Robert Cooper, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 42 days.

(21) Appl. No.: 14/386,761

(22) PCT Filed: Feb. 27, 2013

(86) PCT No.: PCT/GB2013/000083
§ 371 (c)(1),
(2) Date: Sep. 19, 2014

(87) PCT Pub. No.: WO2013/140110
PCT Pub. Date: Sep. 26, 2013

(65) Prior Publication Data
US 2015/0071098 A1    Mar. 12, 2015

(30) Foreign Application Priority Data

Mar. 20, 2012  (EP) .................................... 12250064
Mar. 20, 2012  (EP) .................................... 12250065
Mar. 20, 2012  (EP) .................................... 12250067

(51) Int. Cl.
G08C 15/00    (2006.01)
H04M 19/00    (2006.01)
(Continued)

(52) U.S. Cl.
CPC ............ H04M 19/001 (2013.01); H04B 3/46 (2013.01); H04L 12/10 (2013.01);
(Continued)

(58) Field of Classification Search
CPC .. H04M 19/001; H04L 12/10; H04L 12/2869; H04L 41/08; H04B 3/46; Y04S 40/162
See application file for complete search history.

(56) References Cited

U.S. PATENT DOCUMENTS 5,224,154 A    6/1993  Aldridge et al.
7,239,628 B1   7/2007  Pendleton et al.
(Continued)

FOREIGN PATENT DOCUMENTS

EP    1936861     6/2008
EP    12250064    6/2012
(Continued)

Primary Examiner — Kevin Mew
(74) Attorney, Agent, or Firm — Nixon & Vanderhye P.C.

(57) ABSTRACT

A power injection system (5) for delivering electrical power to one or more communications connections in a network, is responsive to a monitor (54) which measures the amplitude of signals present on the line to control an injector (55) such that it delivers a line voltage which, combined with the measured signal amplitude complies with a predetermined limit for the line.

13 Claims, 4 Drawing Sheets

(51) Int. Cl.
  *H04L 12/10* (2006.01)
  *H04L 12/24* (2006.01)
  *H04L 12/28* (2006.01)
  *H04B 3/46* (2015.01)

(52) U.S. Cl.
  CPC .......... *H04L 12/2869* (2013.01); *H04L 41/08* (2013.01); *Y04S 40/162* (2013.01)

(56) References Cited

U.S. PATENT DOCUMENTS

| | | | |
|---|---|---|---|
| 8,089,785 B2* | 1/2012 | Rodriguez | H02M 7/4807 323/906 |
| 2002/0084655 A1* | 7/2002 | Lof | F03D 7/0284 290/44 |
| 2003/0202655 A1 | 10/2003 | Nattkemper et al. | |
| 2005/0012395 A1* | 1/2005 | Eckroad | H02J 3/16 307/44 |
| 2006/0164108 A1 | 7/2006 | Herbold | |
| 2006/0291405 A1* | 12/2006 | Karam | H04L 12/10 370/284 |
| 2007/0206749 A1* | 9/2007 | Pincu | H04L 12/10 379/142.1 |
| 2008/0317021 A1 | 12/2008 | Ives et al. | |
| 2009/0091309 A1* | 4/2009 | Balakrishnan | H02M 3/157 323/284 |
| 2010/0046506 A1* | 2/2010 | Feldman | H04L 12/10 370/352 |
| 2010/0223480 A1* | 9/2010 | Fratti | H04L 12/10 713/300 |
| 2011/0298305 A1* | 12/2011 | Chisenga | H02M 3/156 307/151 |
| 2012/0009297 A1* | 1/2012 | Ochi | B29C 45/7666 425/556 |
| 2012/0026760 A1* | 2/2012 | Juhlin | H02J 3/36 363/35 |
| 2012/0081933 A1* | 4/2012 | Garrity | H02M 7/4807 363/37 |
| 2012/0290145 A1* | 11/2012 | Joshi | H02J 3/385 700/298 |
| 2013/0238148 A1* | 9/2013 | Legbedji | G06Q 10/04 700/286 |
| 2014/0015250 A1* | 1/2014 | Teodorescu | F03D 7/0284 290/44 |
| 2014/0115354 A1* | 4/2014 | Jabbaz | H04L 12/10 713/310 |
| 2014/0314412 A1* | 10/2014 | Soto | H04L 12/2898 398/67 |
| 2015/0071429 A1* | 3/2015 | Edwards | H04L 12/2869 379/324 |

FOREIGN PATENT DOCUMENTS

| | | |
|---|---|---|
| EP | 12250065 | 6/2012 |
| EP | 12250067 | 9/2012 |
| GB | PCT/GB2013/00082 | 4/2013 |
| WO | WO 01/22716 | 3/2001 |
| WO | WO 02/091790 | 11/2002 |
| WO | WO 2004/111757 | 12/2004 |
| WO | WO 2013/140108 | 9/2013 |
| WO | WO2013/140109 | 9/2013 |

* cited by examiner

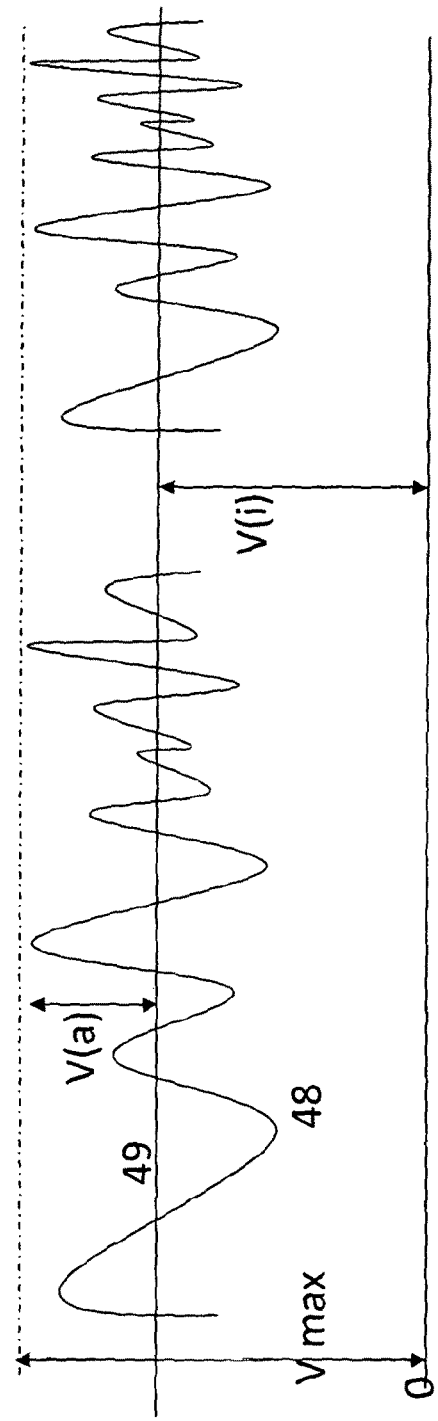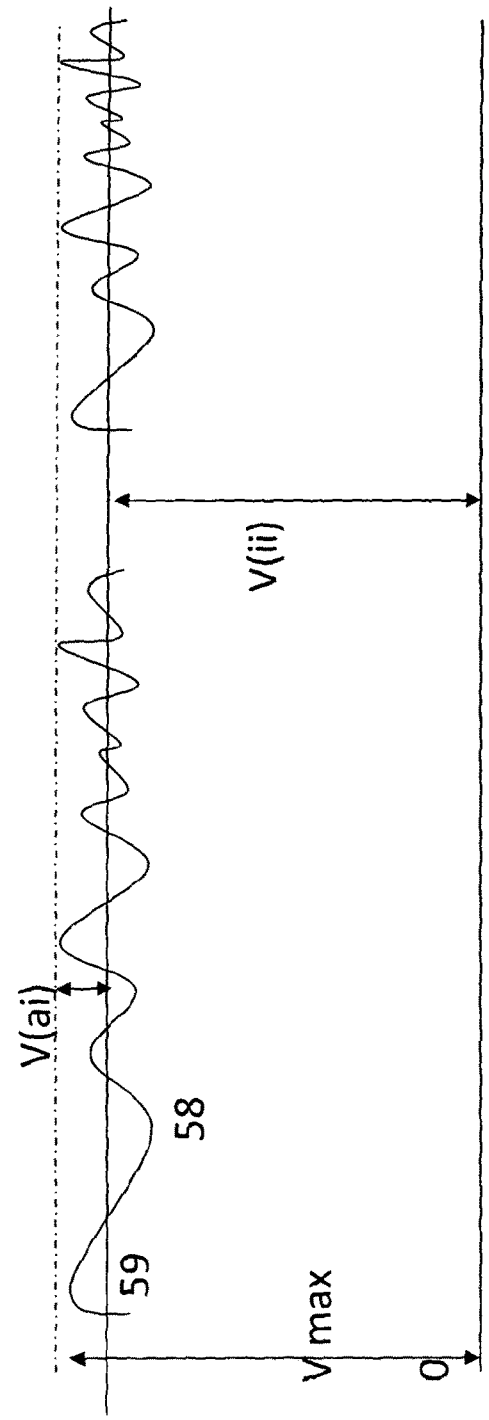

DELIVERY OF ELECTRICAL POWER

This application is the U.S. national phase of International Application No. PCT/GB2013/000083 filed 27 Feb. 2013 which designated the U.S. and claims priorities to EP 12250064.8 filed 20 Mar. 2012; EP 12250065.5 filed 20 Mar. 2012; and EP 12250067.1 filed 20 Mar. 2012, the entire contents of each of which are hereby incorporated by reference.

TECHNICAL FIELD

This invention relates to telecommunications systems, and in particular to the supply of electrical power to equipment in a telecommunications network.

BACKGROUND AND SUMMARY

In the public switched telephone network (PSTN) it is known to provide power from the exchange, or from an intermediate point such as a street side cabinet, to a remote point such as customer premises equipment or another intermediate point such as a drop-point, using the telephone wires themselves—the traditional twisted wire pair, typically made of copper wire. In the early development of telephone systems, when mains electricity was still comparatively rare, this allowed provision of service to premises which had no reliable power supply, or a supply which was unreliable, and it is still a useful feature of the PSTN system that communication is possible during a local power failure—in particular so that a call can be made to the electricity suppliers to alert them to the power failure.

There is an increasing demand for electronic communications equipment (e.g. wireless access points, CCTV cameras, machine-to-machine sensors, signage, and monitoring services such as for fire or burglar alarms). It is often necessary to install such equipments in locations where there is no existing power supply. The provision of mains electrical power in new locations can be costly, and there is therefore increasing interest in the capability to provide the electrical power the equipment requires over the same physical connection as that by which the electronic communications equipment transmits and receives data. This enables such services to be provided at locations which have no power supply (mains, generator, or battery). Provision may also be made to use the telecommunications connection to deliver a backup electricity supply for use in the event of failure of the usual power supply.

However, there are constraints regarding the amount of power that can be provided in this way over a wire pair, primarily due to the limitations of the electrical path that a twisted wire pair provides. In particular, the power supply must not interfere with the primary function of the path, to support communications. Moreover, there is a risk of the conductors overheating, or of insulation breakdown, if an attempt is made to carry large continuous currents for which they were not designed. The maximum power for which such connections were originally intended is sufficient to ring a telephone bell, but this is only required for a short period. It is not generally possible to use the power available over a standard telephone connection to supply more complex telecommunications equipment such as facsimile machines, answering machines, and computers.

The inventors have recognised that, for most of the time, any given wire in the network is carrying much less power than its maximum load, and that this spare capacity can be used to deliver power to devices in the network.

One way to increase the amount of available power is to use multiple pairs so that each pair carries current and voltage within safety limits, but the power can be aggregated at the remote device. The present invention, and the inventions which are the subject of the present applicant's related patent applications filed on the same date as the present application claiming priority from European patent applications 12250064.8 and 12250067.1, and entitled "Control of Line Power" and "Power Distribution for Telecommunications System", all relate to managing the use of multiple wire lines to provide power to remote equipment. By arranging for the power required by an individual node to be distributed over several wire pairs, the limitations on any individual connection can be overcome.

However, the demand for connectivity makes it impracticable to identify sufficient spare (unused) wire pairs which can be dedicated simply for line powering. It is therefore desirable to use active pairs for line powering. On a telephone network, typically an active pair carries a dc component (−48 v), "POTS" (standard analogue telephony), and digital signalling using one of the DSL (digital subscriber line) systems such as HDSL, ADSL, VDSL, (respectively "high rate", "asymmetric", and "very high speed" DSL). To use an active pair to carry an injected power supply, the POTS is encapsulated into a G.711 64 kbps bitstream, and an increased DC bias voltage is added onto the pair, to provide the injected power supply. Essentially POTS and xDSL data signals are carried as modulations on the DC power supply. At the line termination, the xDSL, G.711 and DC are separated with a filter. A DC-DC power converter generates −48V, and the G.711 is converted back to POTS. A combiner takes the 48V, xDSL and POTS to recreate a standard telephony signal. This enables underutilised wiring to be used efficiently, and also enables the power supplied to each wire pair to remain within safe limits.

A power line injector has been developed which is capable of adapting its power output over a each of a plurality of wire pairs to provide a required current (~60 milliAmps per pair) to a remote equipment. Examples of remotely powered equipment currently contemplated include a specially adapted wireless access point or other type of end terminal, such as a Power-over-Ethernet adaptor. This allows provision of services such as wireless communications; and the provision of electrical power for distribution over Ethernet communications cable networks even at locations where no other form of power is available. The power injector dynamically determines the amount of electrical power to inject into each individual wire pair so as to ensure that the maximum power that can be delivered safely is provided. In addition, providing power in this way enables power monitoring and related services to be provided by the telecommunications service provider.

To maximise the delivered power on each pair, the voltage and current on each wire pair should be as close as practicable to the maximum for which the wire pair is rated. However, when an alternating current signal, for example a DSL (digital subscriber loop) signal is also present on a wire pair, this will add a modulation onto the dc power supply, and the peak voltage may exceed the specified limit. For example, if there is a 200V limit, and the DSL signal has a peak voltage of 30V, then the maximum safe voltage should be limited to 170V. In practice a small tolerance would be allowed for manufacturing variance, temperature fluctuations, etc.

In some circumstances (for example in active street cabinets) where DSL is injected onto the network, the voltage of the alternating current signal has to be reduced in order to reduce cross-talk between two wire pairs. This is a particular problem where a street cabinet is handling wire pairs originating at nodes at different distances. For example, if a cable carries both ADSL from a telephone exchange and VDSL from an active cabinet some distance from the exchange, then if the VDSL were introduced at the same peak voltage as the ADSL, interference from the VDSL pair into the ADSL pair would be more significant than the anticipated interference from an ADSL pair into another ADSL pair. Typically cabinets are assigned a "CAL" value which reduces the voltage of the xDSL signal.

In other circumstances, some pairs may carry no xDSL, and be used solely for line powering.

To remain within allowable limits, the maximum dc voltage that can be carried on a given wire pair therefore depends on the magnitude of any ac signal it may be expected to carry. It would be possible to control power injection such that all wire pairs carry the same dc voltage, but this would be unduly restrictive because it would have to be set for the "worst case" (highest ac voltage) situation and would be significantly lower than that which the majority of lines could actually carry.

One way to allow the maximum possible voltage would be to individually set the line voltage on each pair. However, if the injector is controlled manually there would be significant risk of a misconfiguration, resulting in excessive voltages being present on the line or, less problematically, power being restricted unnecessarily. It would also require continuous monitoring to ensure timely responses to any changes in line usage.

The present invention provides a power injection system for delivering electrical power to one or more communications connections in a network, comprising a power control system for controlling the power to be delivered to the or each connection by the power injection system, the control system having a monitor for measuring the amplitude of signals present on the line, and an injector arranged to be controlled by the monitor such that it delivers a line voltage, such that the combined line voltage and signal amplitude complies with a predetermined limit for the line.

A further aspect provides a method for delivering electrical power to one or more communications connections in a network, wherein a power control system controls the power to be delivered to the or each connection, the control system being controlled in response to a sensor which measures the amplitude of signals present on the line and controls the injector such that it delivers a line voltage such that the combined line voltage and signal amplitude complies with a predetermined limit for the line.

The monitoring and power injection control system need not be co-located with the power injection point, and may control the delivery of power to connections at a plurality of locations in the network.

BRIEF DESCRIPTION OF THE DRAWINGS

An embodiment of the invention will be described by way of example and with reference to the drawings, in which:

FIGS. 4 and 5 illustrate how the maximum power that can be delivered is dependent on the amplitude of the signalling carried on the line.

DETAILED DESCRIPTION OF EXAMPLE EMBODIMENTS

Figure 1:
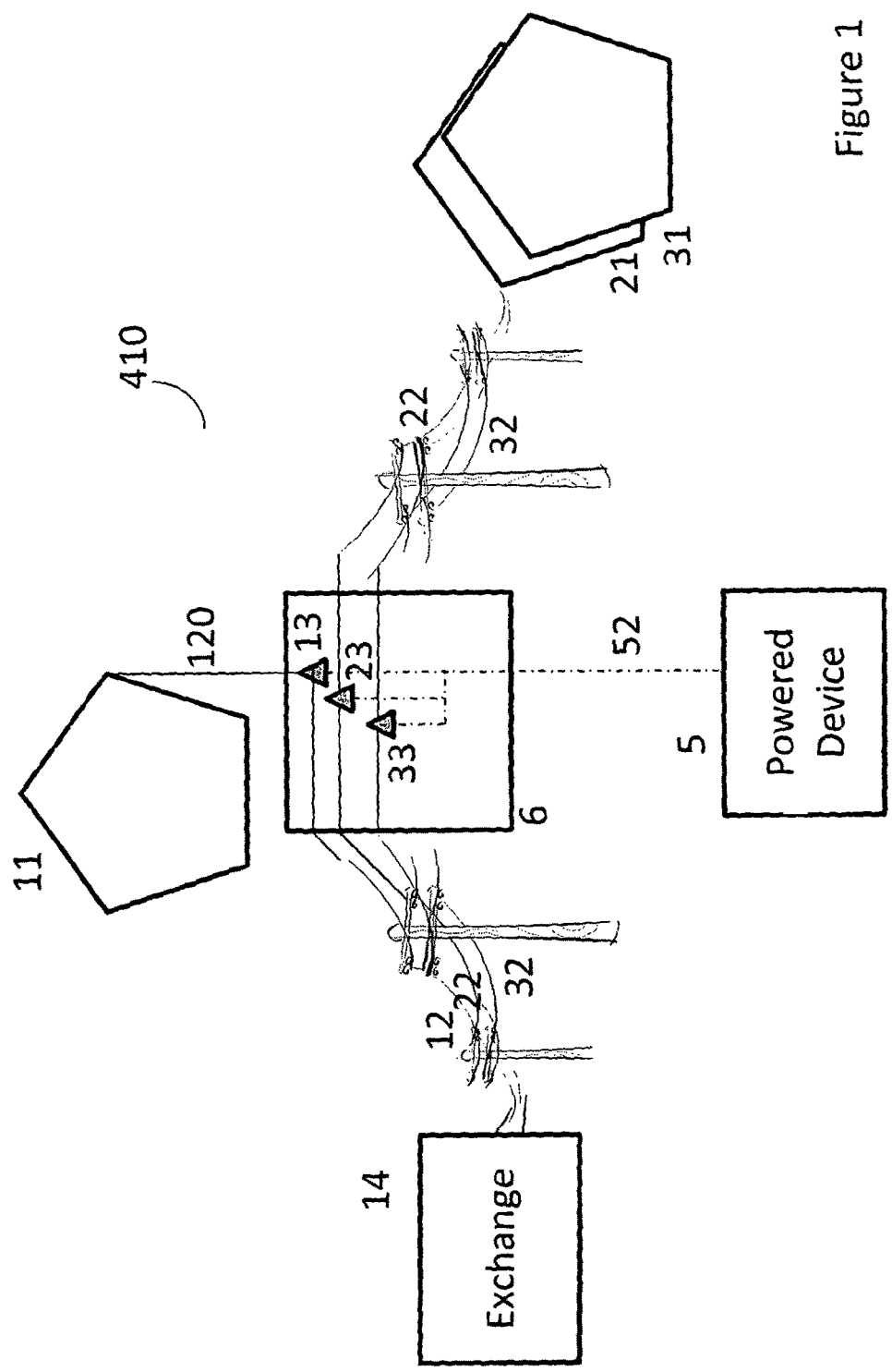
FIG. 1 is a simplified schematic representation of a communications network suitable for operation of a power injection system controlled according to the invention.

FIG. 1 depicts a communications network (410) connecting a number of customer terminals (11,21,31) to a network connection point (1). The network connection point (1) may be a telephone exchange ("switch") (14) or some point intermediate between the exchange and the customer terminations (11,21,31). A respective wire pair (12,22,32) is connected between each customer terminal (11,21,31) and the network connection point (1). Each wire pair provides the customer's standard telephone communication link between the switch 14 and the customer termination 11, and for communication purposes is dedicated to that customer alone.

Electrical power is delivered to a device 5 from a power source 50 using a power injector 15, typically but not necessarily at the exchange 1 or at a kerbside cabinet or other location in the distribution network, using one or more wire pairs 12,22,32. Each such wire pair provides a communication connection between the switch 14 and a respective individual customer termination 11, 21, 31. Power is extracted from each wire pair at a convenient connection point 13, 23, 33 in the network 410.

FIG. 1 also shows a device (5) which is to be powered by electricity delivered from the network connection point (1). The line-powered device (5) may be co-located with the customer equipment (11), for example a computer modem, or it may be at a remote location, for example for use as an intruder alarm system or for other monitoring purposes. The line powered device 5 may also be part of the network infrastructure itself, for example equipment for conversion between communication media (electrical/wireless/optical). Whilst the copper communications lines 12, 22, 32 may each ultimately be connected to different customer premises 11,21, 31, power may be extracted from the network at an intermediate distribution point 6 in the access network, for example to enable broadband connectivity between the customer premises and the distribution point to be supported. In the example depicted in FIG. 1, an exchange 14 is connected to several customer premises equipments 11, 21, 31 through respective individual wire-pair connections 12, 22, 32. These connections use a common routing between the exchange 14 and a distribution point 6, where one of the wire pairs 12 is connected to customer premises 11 over a "final drop" connection 120. An electrically powered device 5 takes power from some or all of the connections 12, 22, 32 passing through the distribution point 6, using line taps 13,23,33.

Whilst the individual communications lines 12 are each ultimately connected to different customer premises equipments 11, power may be extracted from the network at an intermediate point 13 in the access network 410 such as a "distribution point"—the point where the physical routings of separate wire wires diverge to serve separate premises. The use of multiple wire pairs to a point close to the tapping point enables more power to be delivered to a line powered device 5 than can be supported by a single wire pair 12. The Figures show all the line taps 13, 23, 33 to be co-located at one distribution point 6, but this is not to be taken as limitative—power may be collected from line taps at several different physical locations—conversely, the line taps at a given location may supply more than one equipment 5. More complex power delivery systems may require control of the power distribution. Some aspects of this are discussed in the applicant's copending application having the same filing date and entitled "Control of Line Power"

Figure 2:
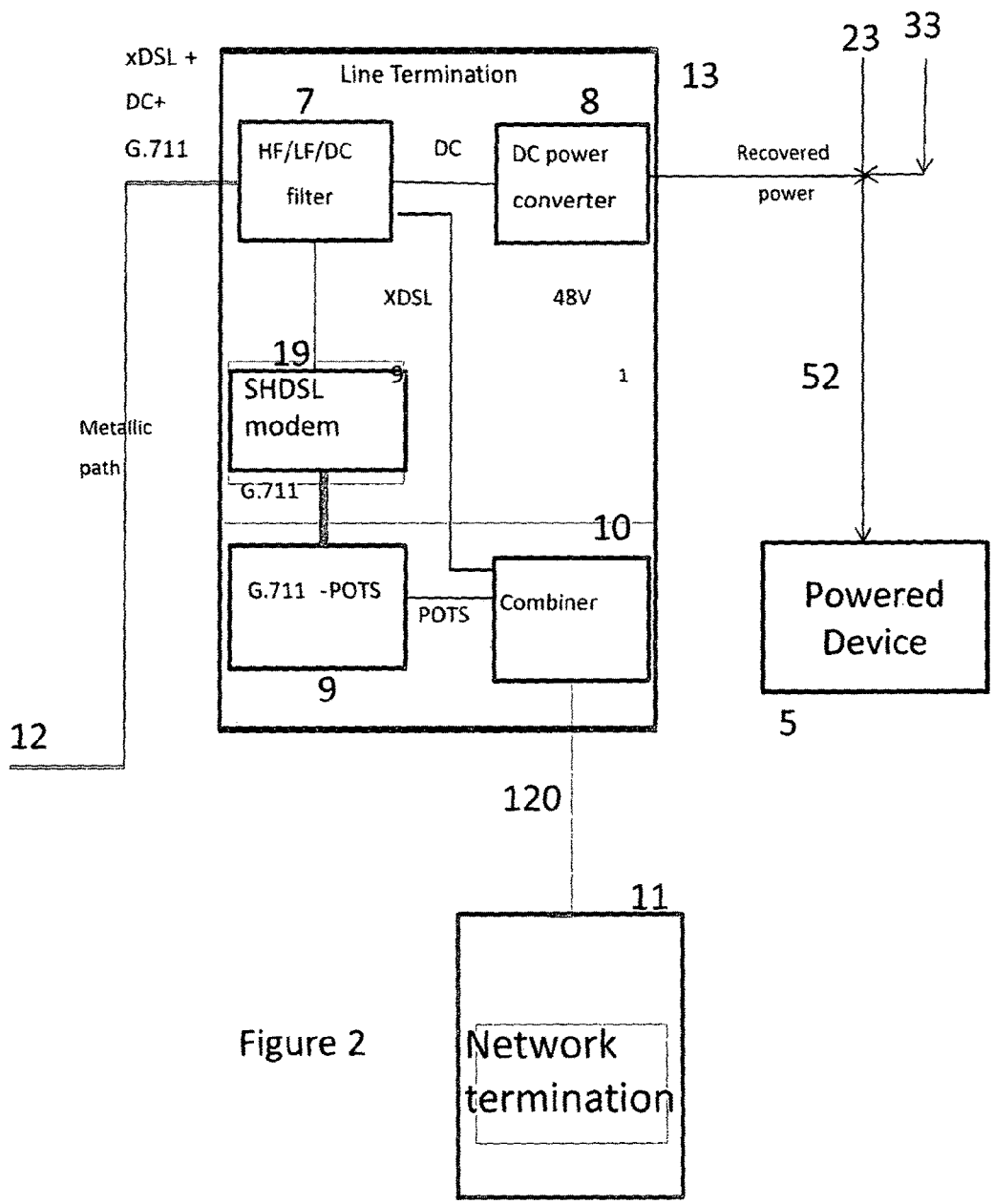
FIG. 2 is a simplified schematic representation of the elements of a network element having a power recovery system.

FIG. 2 depicts one of the line taps 13 in more detail. As will be described, the POTS (analogue telephone signal) and digital subscriber loop (internet) signals are both carried as modulations on a dc carrier. Signalling on the PSTN line may also be carried, for example in an AC15 signalling channel. To allow all the signals to be carried, the POTS signal is carried in an encoded form (for example using a G.711 codec), and modulated onto the wire pair in. a band separate from the one used by the xDSL signal, for example using an SHDSL (symmetric HDSL) modem, running at 64 kbps, which is adequate for the G.711 coding. The two incoming signals are extracted from the direct current carrier using a filter 7. The SHDSL signal carrying the G.711 coding is then demodulated and converted back to an analogue signal in a modem 19 and codec 9, and the xDSL and POTS analogue signals are then recombined in a combiner 10 for transmission over the "final drop" connection 120 to the customer premises 11, where telephony and computing equipment can be connected to the network termination using further filters in conventional manner. The direct current output from the filter 7 is fed to a power converter 8 which extracts sufficient power to operate the conventional telephony services (in particular ringing current) and delivers the remaining power over a power connection 52 to an electrically powered device 5. As is shown in FIG. 1, a single equipment 5 may be powered from several line taps 13, 23, 33 each delivering part of the total power requirement.

Figure 3:
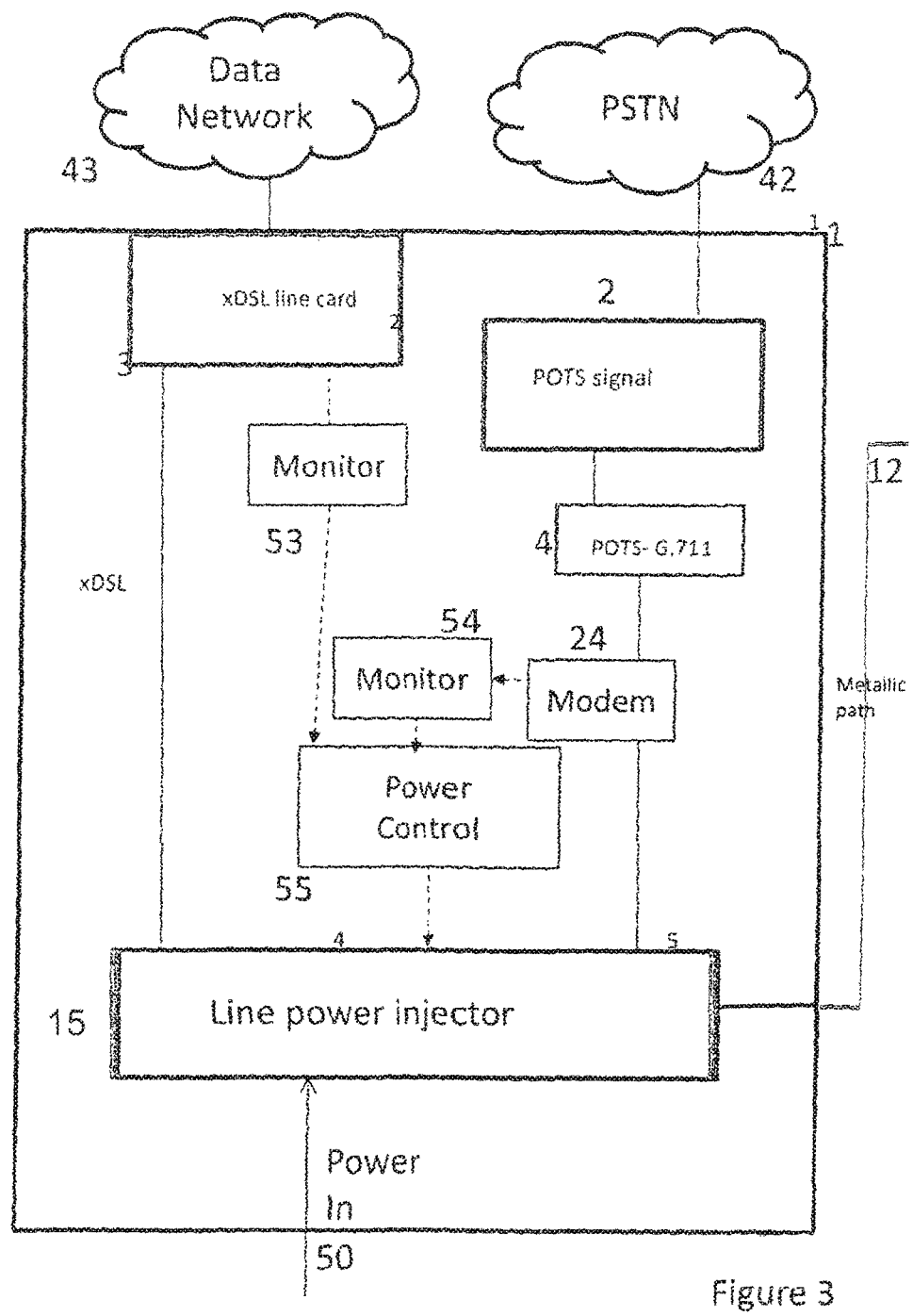
FIG. 3 depicts the functional elements of a network element having a power injection control system according to the invention.

A power injection system according to the invention will now be described with reference to FIG. 3, which depicts a power injection system 15 installed in an exchange 1. It will be understood that power may be injected into a wire pair 12 at any other point between the exchange 1 and the user's network termination 11, for example at a distribution point (kerbside cabinet).

As is conventional, the wire pair 12 may carry both analogue (POTS) signalling and digital subscriber loop (xDSL) digital signalling, fed to the wire pair by respective line cards 2, 3 from respective circuit switched and packet switched networks 42, 43. The analogue "POTS" signal is digitised by a modulation element 4 which encapsulates the analogue POTS signal into a 64 kbps digital data stream using a pulse code modulation system with an 8 kHz sampling frequency, such as the G.711 standard, which can also incorporate signalling (ring current, dialing tones, etc) converted from a 16 kbps signalling stream (AC15 standard). This allows the signal to be carried on the same carrier as the digital G.711 signal. The G.711/signalling stream is modulated onto a band separate from the one used by the xDSL signal, for example using an SHDSL (symmetric HDSL) modem 24 running at 64 kbps, which is adequate for the G.711 coding. The xDSL and SHDSL signals are then both modulated by a power injector 15 onto a dc power supply delivered from a power source 50 for transmission over the metallic path 12.

To remain within allowable limits, the maximum do voltage that can be carried on a given wire pair 12 depends on the magnitude of any ac signal it may be expected to carry. This is illustrated in FIGS. 4 and 5, which show signalling overhead signals 48, 58 having different respective amplitudes V(a), V(ai) together with a dc bias 49, 59. It will be seen that for the signal 48 having the larger amplitude, the dc bias 49 has to be set at a lower level V(i) than the level V(ii) possible when the amplitude V(ai) is reduced, so as to maintain the combined output below a predetermined maximum level V(max). It would be possible to arrange that all power injectors 15 are limited such that all wire pairs carry the same dc voltage, but this would be unduly restrictive because it would have to be set for the "worst case" (highest ac amplitude) situation and would be significantly lower than that which the majority of lines could actually carry.

In the present invention this is achieved by providing a monitoring function 53, 54 to identify the amount of activity on each of the DSL and POTS connections, and more specifically the amplitude of the modulations imposed on the wired connection by the line card 3 and SHDSL modem 24 respectively. These monitoring functions 53, 54 provide inputs to a power control function 55 which controls the dc voltage delivered by the line power injector 15 such that the maximum value (dc voltage plus ac amplitude), is maintained within a predetermined limit.

The line card 3 and G.711 processor 4 handle traffic passing in both directions over the connection 12, but the monitors 53, 54 are only concerned with the peak currents generated by that traffic and therefore do not need to determine what traffic is being transmitted from the remote end.

The power injector 15 may have other control inputs, to control when, and to which wire pairs 12, power is to be delivered, for example as described in the applicant's copending application having the same filing date and entitled "Control of Line Power"

In addition, the distance from the exchange/cabinet 1 from each equipment 5 being powered using access lines 12 affects the amount of power which can be safely injected by the power injector 15. Also, some types of DSL (digital subscriber loop (e.g. VDSL) reduce the signal level transmitted from a cabinet to avoid excessive cross-talk onto wire pairs which are fed from a more distant signal source (e.g. a telephone exchange). Where the power injector 15 is connected to a wire pair subject to such controls, the maximum powering voltage set in the power control system 55 can be adjusted, under the control of the power limiting function, to take account of this reduction in signal level.

Whilst the communications lines 12, 22, 32 may ultimately be connected to different customer premises 11, 21, 31, power may be extracted from the network at an intermediate point in the access network 410 such as a distribution point 6, to enable broadband connectivity between the customer premises and the drop-point to be supported.

In one example, described in more detail in our copending application having the same filing date and entitled "Power Distribution for Telecommunications System", power carried by the access lines is extracted to power a wireless broadband link, which enables broadband connectivity to be supported in more remote rural areas for a lower infrastructure cost than would be incurred if a dedicated fixed broadband link were to be provided.

The invention claimed is:

1. A power injection system for delivering electrical power to one or more communications connections in a network, comprising a power control system for controlling the power to be delivered to the or each connection by the power injection system, the control system having a monitor for measuring the amplitude of signals present on the line, and an injector arranged to be controlled by the monitor such that it delivers a line voltage, such that the combined line voltage and signal amplitude complies with a predetermined limit for the line.

2. A power injection system according to claim 1, wherein the monitor is located at a position in the network remote from the injector.

3. A power injection system according to claim 1, wherein the monitor detects activity on a packet switched connection.

4. A power injection system according to claim 1, wherein the monitor detects activity on a circuit switched connection.

5. A method for delivering electrical power to one or more communications connections in a network, wherein a power control system controls the power to be delivered to the or each connection, the control system being controlled in response to a sensor which measures the amplitude of signals present on the line and controls the injector such that it delivers a line voltage such that the combined line voltage and signal amplitude complies with a predetermined limit for the line.

6. A method according to claim 5, wherein the monitor is located at a position in the network remote from the injector.

7. A method according to claim 5, wherein the monitor detects activity on a packet switched connection.

8. A method according to claim 5, wherein the monitor detects activity on a circuit switched connection.

9. A power injection system according to claim 1, wherein:
the line, is configured to carry both a telephone signal and an internet signal, which are both carried as modulations on a dc carrier; and
the monitor is configured to detect the telephone and internet signals carried on the line, so that the amplitude of signals present on the line can be measured.

10. A power injection system according to claim 9, wherein:
the monitor is configured to identify the amount of activity corresponding to each of the telephone and internet signals, including the amplitude of the modulations.

11. A method according to claim 5, wherein:
the tine is configured to carry both a telephone signal and an internet signal, which are both carried as modulations on a dc carrier; and
the telephone and internet signals carried on the line are detected so that the amplitude of signals present on the line can be measured.

12. A method according to claim 11, wherein:
the amount of activity corresponding to each of the telephone and internet signals is identified, including the amplitude of the modulations.

13. A communications network comprising:
a communications connection;
a terminal;
a network connection point;
a line connected between the terminal and the network connection point, the line being configured to carry both an analog signal and a digital signal; and
a power system for delivering electrical power to the communications connections of the network, the power system being configured to:
measure an amplitude of modulations of the analog and digital signals; and
control and deliver a dc line voltage to the communications connection such that the combined dc line voltage and the amplitude of modulations is maintained within a predetermined limit.

\* \* \* \* \*